(12) United States Patent
Gasselseder et al.

(10) Patent No.: US 6,840,748 B2
(45) Date of Patent: Jan. 11, 2005

(54) APPARATUS FOR COOLING AND CALIBRATING AN EXTRUDED PLASTIC PROFILE

(75) Inventors: Wolfgang Gasselseder, Oberneukirchen (AT); Erwin Krumböck, Ansfelden (AT); Siegfried Pramberger, Vorchdorf (AT)

(73) Assignee: a + g extrusion technology GmbH, Pasching (AT)

( * ) Notice: Subject to any disclaimer, the term of this patent is extended or adjusted under 35 U.S.C. 154(b) by 290 days.

(21) Appl. No.: 10/118,408

(22) Filed: Apr. 8, 2002

(65) Prior Publication Data

US 2002/0146477 A1 Oct. 10, 2002

(30) Foreign Application Priority Data

Apr. 9, 2001 (AT) ............................................. 565/2001

(51) Int. Cl.[7] ............................................... B29C 47/52
(52) U.S. Cl. ........................ 425/71; 425/140; 425/325; 425/377
(58) Field of Search .................... 425/71, 140, 325, 425/326.1, 211, 377, DIG. 127

(56) References Cited

U.S. PATENT DOCUMENTS

| 2,423,260 A | 7/1947 | Slaughter |
| 2,903,743 A | 1/1959 | Lysobey |
| 3,552,259 A | * 1/1971 | Griffith ........................ 425/377 |
| 3,958,913 A | 5/1976 | Stangl |

FOREIGN PATENT DOCUMENTS

| DE | 1157378 | 5/1959 |
| DE | 1201038 | 5/1960 |
| DE | 1504364 | 12/1964 |

* cited by examiner

Primary Examiner—Tim Heitbrink
(74) Attorney, Agent, or Firm—Collard & Roe, P.C.

(57) ABSTRACT

The invention describes an apparatus for cooling and calibrating an extruded plastic profile (2) with a cooling tank (4) receiving a cooling liquid, with calibrating elements (5) disposed within the cooling tank (4) for the plastic profile (2) subjected to the cooling liquid, and with a draw-off device (7) which is disposed downstream of the cooling tank (4) in the draw-off direction of the plastic profile (2). In order to provide advantageous constructional conditions it is proposed that at least one damping device (9) is provided between the inlet-sided calibrating element (5) of the cooling tank (4) and the draw-off device (7), which damping device rests at least in sections in the zone of one circumference on the plastic profile (2).

11 Claims, 2 Drawing Sheets

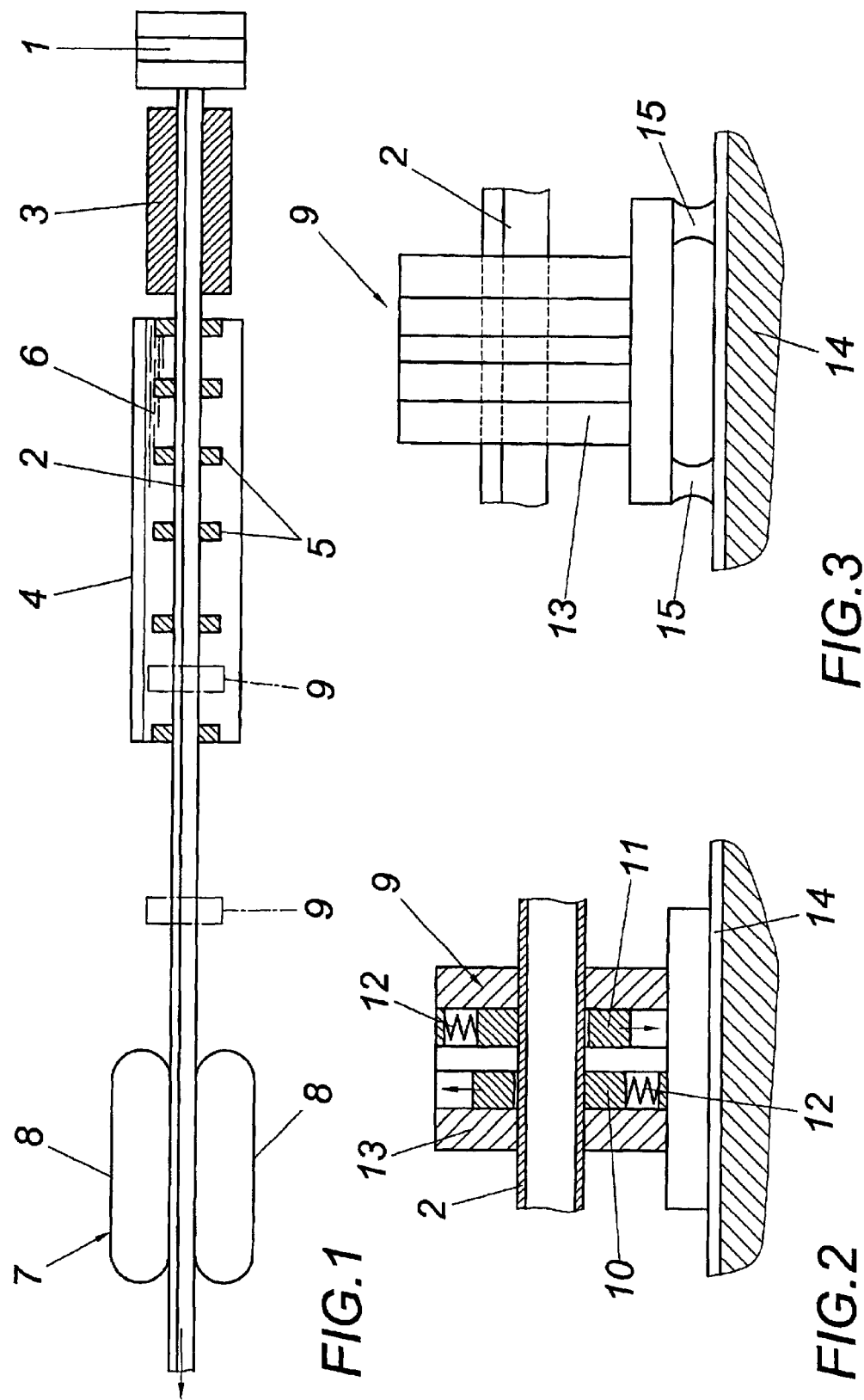

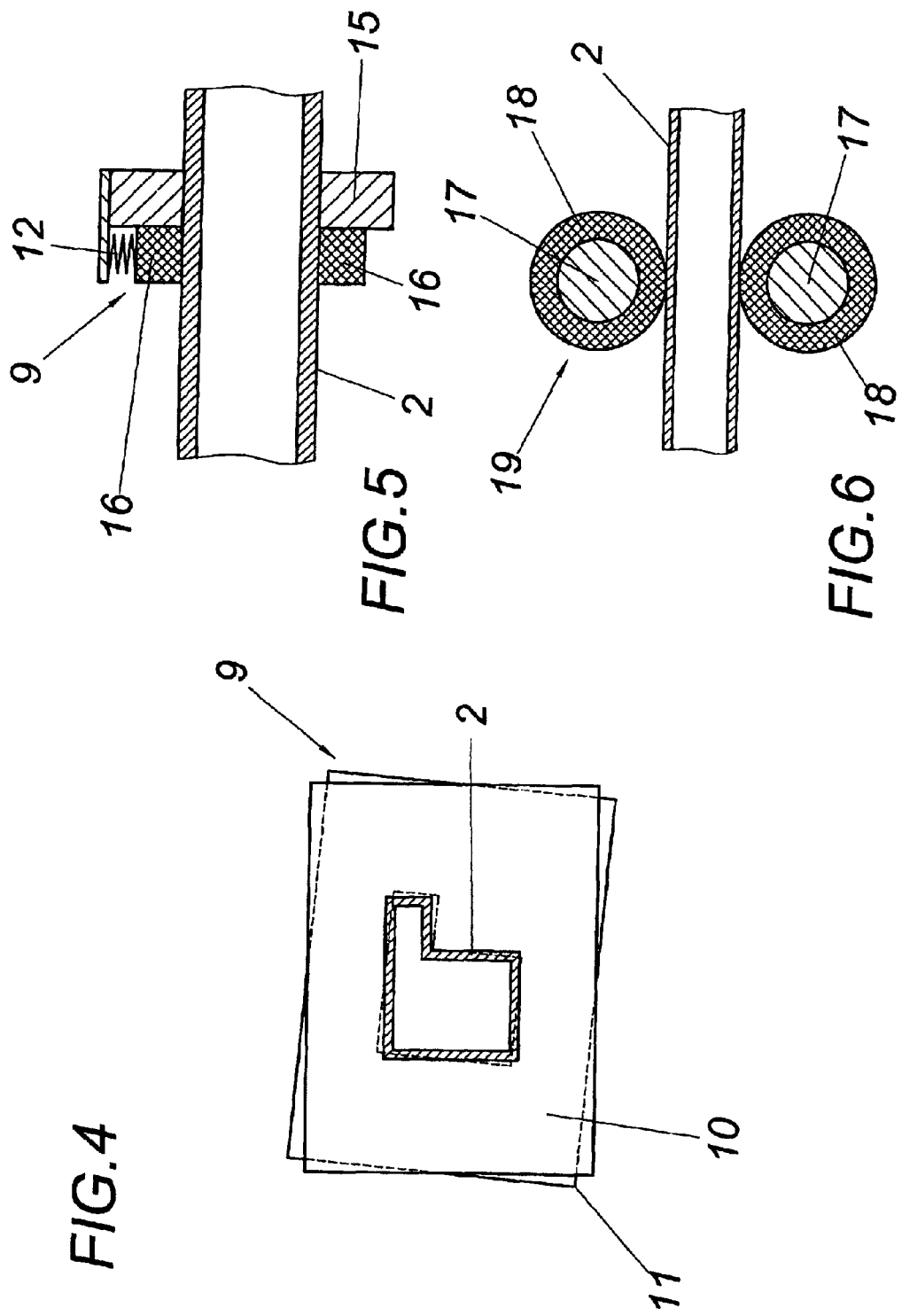

APPARATUS FOR COOLING AND CALIBRATING AN EXTRUDED PLASTIC PROFILE

FIELD OF THE INVENTION

The invention relates to an apparatus for cooling and calibrating an extruded plastic profile with a cooling tank receiving a cooling liquid, with calibrating elements disposed within the cooling tank for the plastic profile subjected to the cooling liquid, and with a draw-off device which is disposed downstream of the cooling tank in the draw-off direction of the plastic profile.

DESCRIPTION OF THE PRIOR ART

During the extrusion of plastic profiles the hot profile strand emerging from the extrusion die for shaping profiles is calibrated and cooled, with a cooling tank being provided for cooling, through which the plastic profile is drawn with the help of a draw-off device which is disposed downstream of the cooling tank. Within the cooling tank the plastic profile is sprayed with a cooling liquid, which is generally water, or is drawn through a cooling liquid bath. The dimensional accuracy of the plastic profile which is drawn through calibrating elements is ensured by said calibrating elements which are disposed at a mutual distance within the cooling tank. Due to circumstances that are not clearly clarified yet, markings on the plastic profile can occur occasionally which are caused by oscillations of the profile and extend transversally to the draw-off direction of the plastic profile and are especially noticeable by differences in the gloss in the surface area.

SUMMARY OF THE INVENTION

The invention is thus based on the object of providing an apparatus for cooling and calibrating an extruded plastic profile of the kind mentioned above in such a way that such occasionally occurring markings can be suppressed.

The invention achieves the object in such a way that at least one damping device is provided between the inlet-sided calibrating element of the cooling tank and the draw-off device, which damping device rests at least in sections in the zone of one circumference on the plastic profile.

The invention is based on the finding that the fine markings which occur mainly on the outside surface of the plastic profile do not depend, in contrast to "chatter marks", on unfavorable frictional conditions between the calibrating elements and the plastic profile but on a stimulation of oscillations of the plastic profile which is clamped between the draw-off device and the calibrating elements in the manner of a chord. These oscillations of the plastic profile, which are possibly also stimulated by resonance phenomena and are substantially longitudinal oscillations, in the zone between the clamping positions formed by the draw-off device and the calibrating elements can be damped by damping devices at least to an extent which excludes surface markings on the plastic profile. The damping device must rest at least in sections in the zone of one circumference on the plastic profile so that such oscillations of the plastic profile can be suppressed. The respectively most favorable damping properties can be used for a damping device when it is provided in the zone of the largest oscillation amplitude, i.e. substantially in the center between the nodal points.

The damping devices can be arranged very differently because merely the suppression of the longitudinal oscillations of the plastic profile is concerned. If a damping device is to be disposed within the cooling tank, it may be necessary under certain circumstances to consider a possible deformation of the plastic profile which is caused by the damping device. In order to ensure the dimensional accuracy of the plastic profile, the damping device may consist in this case of two immediately successive calibrating elements which are mutually offset transversally to the plastic profile and which counteract any impermissible deformation of the plastic profile. Such calibrating elements can also be turned mutually about a longitudinal axis of the plastic profile in order to achieve a profile guidance which suppresses the oscillations of the plastic profile. The pair of calibrating elements of a damping device can naturally also be used instead of a calibrating element to be used otherwise.

In order to ensure that the damping device rests in close fit on the plastic profile independent of any precise setting, at least one of the calibrating elements of the damping device can be loaded in a resilient manner in the direction of its offset with respect to the other calibrating element. Such a resilient loading of the calibrating elements of the damping device can also be used to simply compensate any potentially occurring wear and tear.

Another possibility for constructional arrangement of the damping device is providing two damping rollers which guide the plastic profile between themselves and also suppress any longitudinal oscillation of the plastic profile, especially when said damping rollers rest on the plastic profile with a rubber-elastic running layer. Such damping rollers will be used especially between the draw-off device and the cooling tank, i.e. in a zone in which the plastic profile already has sufficient inherent stability. In order to achieve a force of attack which is sufficient for the oscillation damping irrespective of any tolerances, the damping rollers can be pressed in a resilient manner against the plastic profile.

A further possibility to ensure an effective damping of any occurring oscillations is obtained when the damping device consists of a calibrating element to which the damping bodies are fixed which rest on the plastic profile. Particularly favorable properties with respect to the oscillation damping can be obtained in this connection in such a way that the damping bodies consist of a material which differs from that of the associated calibrating element at least in the zone of the contact on the plastic profile, which supports the damping properties by way of the changing frictional conditions. It is understood that such damping bodies which can be fixed to existing calibrating elements can be pressed in a resilient manner against the plastic profile, namely with comparable advantages.

Usually, damping devices will be disposed in a rigid manner on their supports. It may be advantageous under certain circumstances to support the damping devices via spring bodies on their supports, so that a changed natural oscillation behavior of the plastic profile and the damping device is obtained for example, leading to the effect that resonance oscillations leading to markings on the plastic profile are suppressed.

BRIEF DESCRIPTION OF THE DRAWING

The subject matter of the invention is shown by way of example in the drawings, wherein:

FIG. 1 shows an apparatus for cooling and calibrating an extruded plastic profile in a schematic longitudinal sectional view;

FIG. 2 shows a damping device in accordance with the invention in a sectional view through a longitudinal axis of the plastic profile on an enlarged scale;

FIG. 3 shows the damping device according to FIG. 2 in a side view, but with a resilient support with respect to a carrier;

FIG. 4 shows a constructional variant of a damping device in accordance with the invention in a view in the longitudinal direction of the plastic profile;

FIG. 5 shows a further embodiment of a damping device in accordance with the invention in a sectional view through a longitudinal axis of the plastic profile, and FIG. 6 shows a further modified embodiment of a damping device in accordance with the invention in a sectional view along a longitudinal axis of the plastic profile.

DESCRIPTION OF THE PREFERRED EMBODIMENT

As is shown in FIG. 1, the hot plastic profile 2 emerging from the extrusion die 1 for shaping profiles downstream of an extruder is pulled through a calibrating device 3 before passing through a cooling tank 4 in which calibrating elements 5 are provided at a distance from one another in order to ensure the dimensional accuracy of the plastic profile 2 also during the cooling. The calibrating elements 5 must therefore be arranged in such a way that the cooling-induced shrinkage of the plastic profile 2 is taken into account. The cooling liquid used for cooling the plastic profile 2, which is usually water, can be sprayed onto the plastic profile 2. Simpler constructional conditions are obtained, however, when the plastic profile 2 is pulled through a cooling liquid bath 6 in the cooling tank 4. A draw-off device 7 is used for drawing off the plastic profile 2 from the cooling tank 4, which draw-off device grasps the plastic profile 2 in the conventional manner with the help of revolving crawlers 8.

In order to suppress occasionally occurring oscillations of the plastic profile 2 which are caused by its clamping in the crawler-type draw-off system 7 on the one hand and in the calibrating elements 5 or the calibrating device 3 on the other hand at least to an extent that excludes visible marks on the surface of the plastic profile 2, damping devices 9 are used to an extent as required, which damping devices reduce any occurring oscillations to an at least permissible amount. Such damping devices are therefore preferably provided in the zone between the cooling tank 4 and the draw-off device 7, but also in the cooling tank 4, preferably in the outlet-sided third.

As is shown in FIGS. 2 to 6, the constructional arrangement of the damping devices can be very different, because it is merely relevant to accordingly reduce the oscillations of the plastic profile 2, especially in the longitudinal direction. If a damping device 9 is provided in the zone of the cooling tank 4, an arrangement of the damping device in the form of a calibrating element is recommended in order to avoid endangering the dimensional accuracy of the plastic profile 2. The shape of the element of damping device 9 can naturally also be used outside of the cooling tank. FIGS. 2 and 3 show such damping devices which consist of two directly adjacent calibrating elements 10 and 11 which are mutually offset transversally to the plastic profile 2, as is indicated in FIG. 2 by the arrows. Since the calibrating elements 10 and 11 act on the plastic profile 2 on mutually opposite sides thereof, longitudinal oscillations of the plastic profile 2 can be suppressed effectively by this pair of calibrating elements 10 and 11. In order to compensate tolerances and wear phenomena, at least one of the two calibrating elements 10, 11 can be loaded in a resilient manner by a spring 12 in the direction towards the mutually offset of the two calibrating elements 10 and 11.

The damping device 9 according to FIG. 3 differs from the one according to FIG. 2 only in the respect that the housing 13 which receives the two calibrating elements 10 and 11 is not connected rigidly with the support 14, but is supported by a spring 15 with respect to said support 14, so that the damping device 9 becomes a part of the oscillation system as determined by the plastic profile 1, leading to the consequence that the natural oscillations of the oscillation system will shift, which can lead to a sufficient reduction of the oscillation amplitudes which are relevant for the occurrence of markings on the plastic profile 1.

The damping device 9 according to FIG. 4 also uses a pair of calibrating elements. However, the calibrating elements 10, 11 are swiveled with respect to one another about a longitudinal axis of the plastic profile 2. The plastic profile 2 is clamped in a positive-locking manner between said calibrating elements 10 and 11, which leads to the desired suppression of longitudinal oscillations of the plastic profile 2 without having to fear any deformation of the plastic profile 2 which would endanger the dimensional accuracy of the plastic profile 2.

According to FIG. 5 the damping device 9 consists of a calibrating element 5 which is provided in the cooling tank 4 and to which damping bodies 16 are fixed which rest on the plastic profile 2. Said damping bodies 16 preferably consist of a material which differs from that of the calibrating element 5 in order to achieve different frictional conditions with respect to the plastic profile 2, as a result of which the desired oscillation damping is supported. Of all the damping bodies 16, at least one can be pressed by a spring 12 against the plastic profile 2.

Finally, FIG. 6 shows a damping device 9 which consists of two damping rollers 17 which guides the plastic profile 2 between themselves, which damping rollers are excited to perform rotary oscillations via the longitudinal oscillations of the plastic profile 2. Due to the different natural oscillation of the damping rollers 17, an effective damping of the oscillations of the plastic profile 2 is obtained. The damping rollers 17 are provided with a rubber-elastic running layer 18 for the purpose of improved oscillation damping, which running layer is used to act upon the plastic profile, with a brake force on the damping rollers 17 having an advantageous effect on oscillation damping.

What is claimed is:

1. An apparatus for cooling and calibrating an extruded plastic profile, comprising a cooling tank receiving a cooling liquid, calibrating elements disposed within the cooling tank for calibrating the plastic profile subjected to the cooling liquid in the cooling tank, and a draw-off device which is disposed downstream of the cooling tank in the draw-off direction of the plastic profile, and at least one damping device between the inlet-sided calibrating element cooling and the draw-off device, which damping device rests at least in sections in the zone of one circumference on the plastic profile.

2. An apparatus as claimed in claim 1, wherein the damping device consists of two immediately successive calibrating elements which are mutually offset transversally to the plastic profile.

3. An apparatus as claimed in claim 1, wherein, the damping device consists of two immediately successive calibrating elements which are mutually angularly offset about a longitudinal axis of the plastic profile.

4. An apparatus as claimed in claim 2, wherein at least one of the calibrating elements of the damping device is resiliently loaded in the direction of its offset with respect to the other calibrating element.

5. An apparatus as claimed in claim 1, wherein the damping device consists of two damping rollers which guide the plastic profile between themselves.

6. An apparatus as claimed in claim 5, wherein the damping rollers rest with a rubber-elastic running layer on the plastic profile.

7. An apparatus as claimed in claim 6, wherein the damping rollers can be pressed in a resilient manner in the plastic profile.

8. An apparatus as claimed in claim 1, wherein the damping device consists of one of the calibrating elements to which are fixed damping bodies which rest on the plastic profile.

9. An apparatus as claimed in claim 8, wherein the damping bodies consist of a material which differs from that of the associated calibrating element at last in the zone of the contact on the plastic profile.

10. An apparatus as claimed in claim 8, wherein the damping bodies can be pressed in a resilient manner against the plastic profile.

11. An apparatus as claimed in claim 1, that wherein the damping device is supported on a support by of a spring body.

* * * * *